A. A. BEGIN.
LOCK NUT.
APPLICATION FILED APR. 27, 1912.
1,087,867.
Patented Feb. 17, 1914.
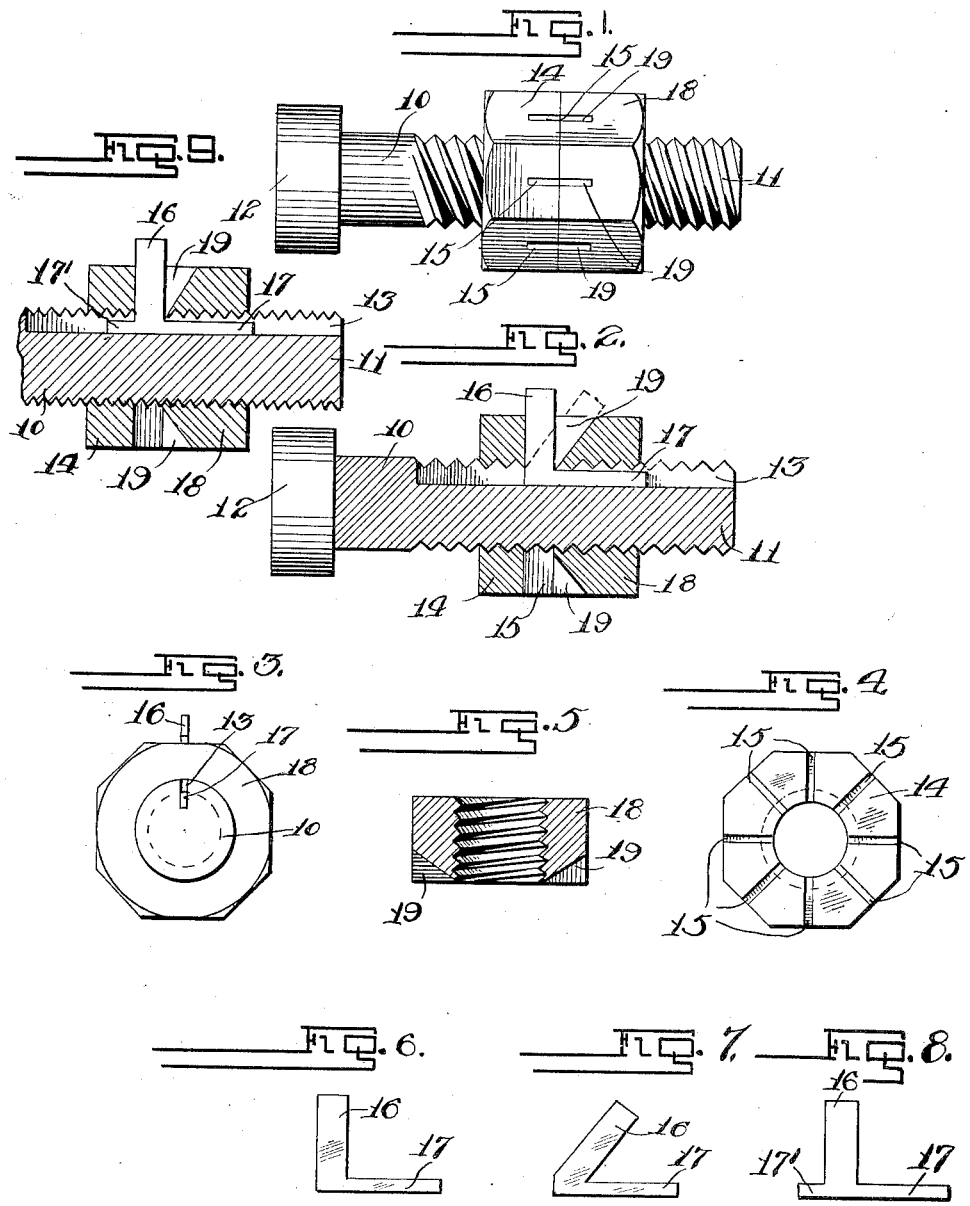
WITNESSES
INVENTOR
Adolphus A. Begin
By His Attorney.

ered angular end of the key.

UNITED STATES PATENT OFFICE.

ADOLPHUS A. BEGIN, OF SIDNEY, OHIO.

LOCK-NUT.

1,087,867.  Specification of Letters Patent.  Patented Feb. 17, 1914.

Application filed April 27, 1912. Serial No. 693,517.

*To all whom it may concern:*

Be it known that I, ADOLPHUS A. BEGIN, a citizen of the United States, residing at Sidney, in the county of Shelby and State of Ohio, have invented certain new and useful Improvements in Lock-Nuts, of which the following is a specification, reference being had therein to the accompanying drawing.

This invention relates to nut locks and the principal object of the same is to provide a combined jam nut and a key, there thus being provided two means for locking the nut. This invention is illustrated in the accompanying drawings wherein:

Figure 1 is a side elevation of the improved nut lock. Fig. 2 is a longitudinal sectional view through the nut lock. Fig. 3 is an end view of the nut lock. Fig. 4 is a plan view of one of the nuts used, looking at the outer face of the nut. Fig. 5 is a sectional view through the jam nut. Fig. 6 is a side elevation of the locking key used. Fig. 7 is a side elevation of the locking key after it has been bent to a locking position. Fig. 8 is a side elevation showing a modified type of locking key. Fig. 9 is a view similar to Fig. 2, showing the modified form of key in use.

Referring to the accompanying drawings it will be seen that this invention comprises a bolt 10 which is provided with a threaded portion 11 and an enlarged head 12, the bolt being provided in its threaded portion with a longitudinally extending groove 13. A nut 14 is screwed upon the bolt and is provided in its outer face with radiating grooves forming seats 15. From inspection of Fig. 2, it will be seen that these grooves have their inner edges extending at right angles to the longitudinal diameter of the nut so that when a key 16 is placed in the seat it will extend at right angles to the bolt 10. The key 16 which is used is formed from relatively soft metal and is provided at its inner end with a tongue 17 of less width than the depth of the groove 13 formed in the bolt. It will thus be seen that when the key is placed in one of the seats 15 that the key will extend through the seat into the groove 13 with the tongue 17 extending through the groove 13 toward the end of the bolt. It should also be noted that the key is of approximately the same width as the depth of the seats 15 so that it does not protrude beyond the outer face of the nut 14. A jam nut 18 is next secured upon the bolt and screwed tightly against the nut 14 so that the threads of the bolt and nut 14 will be jammed. Then the nut 18 is turned until the grooves 19, which are formed in the inner face, register with the grooves 15. The grooves 19 are provided with sloping inner edges extending from the central opening of the nut toward the outer end and are provided so that the key 16 may be bent to cause it to enter the groove 19, as indicated by the dotted line in Fig. 2, the key assuming the shape shown in Fig. 7.

It should be noted that the key extends beyond the side of the nut 14 so it may be readily driven into the groove 19 by means of a hammer and that after it has been driven into the groove 19 that the nut 18 will be securely locked, thus preventing any danger of the nut 18 working loose. It will also be noted that when it is desired to remove the nut 19 that the key 16 can be very readily driven back to its original position to permit the nut 18 to be removed. It will, therefore, be seen that there has been provided a very secure manner of locking the nuts 14 and 18, which may very readily be bent to a locking position and may also be very readily returned to its original position so that the nut 18 will be released.

From an inspection of Figs. 8 and 9, it will be seen that if desired a slightly modified form of key may be used in which there is provided an extension 17' which extends through the groove 13, and is positioned within the nut 14. This end 17' will greatly assist in holding the key in place and forms a lock to prevent the bending of the tongue 17 when driving the key into one of the slots 19.

What I claim is:

1. In a nut and bolt lock, the combination with a bolt provided with a longitudinal groove, a nut engaging the bolt and provided with radial grooves in its outer face, a key seated in the bolt groove and having an enlarged widened solid right angular end portion for engaging and projecting beyond one of the radial grooves of the nut, said key having a short extension that lies in the portion of the bolt groove inclosed by the nut, and a jam nut engaging the bolt and provided with radial grooves in its inner face for the reception of the enlarged widened angular end of the key.

2. In a nut and bolt lock, the combination with a bolt provided with a threaded shank having a longitudinal groove formed therein, a nut engaging the shank and provided with radial grooves in its outer face, a key seated in the shank groove and having a solid widened angular end adapted to enter and project longitudinally and laterally beyond one of the grooves of the nut, and a jam nut provided with radial grooves adapted for selective engagement by the widened angular end of the key.

In testimony whereof I hereunto affix my signature in presence of two witnesses.

ADOLPHUS A. BEGIN.

Witnesses:
 GEO. L. TIMENS,
 ROYAN G. HESS.

Copies of this patent may be obtained for five cents each, by addressing the "Commissioner of Patents, Washington, D. C."